(12) United States Patent
Jeong et al.

(10) Patent No.: US 10,167,574 B2
(45) Date of Patent: Jan. 1, 2019

(54) POROUS SURFACE FOR BIOMEDICAL DEVICES

(71) Applicant: Applied Materials, Inc., Santa Clara, CA (US)

(72) Inventors: Sangmin Jeong, Palo Alto, CA (US); Hann-Ching Chao, San Carlos, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 959 days.

(21) Appl. No.: 14/577,971

(22) Filed: Dec. 19, 2014

(65) Prior Publication Data

US 2016/0121292 A1    May 5, 2016

Related U.S. Application Data

(60) Provisional application No. 62/073,807, filed on Oct. 31, 2014.

(51) Int. Cl.

| C40B 50/18 | (2006.01) |
|---|---|
| C40B 60/00 | (2006.01) |
| C40B 60/04 | (2006.01) |
| B01L 3/00 | (2006.01) |
| B01J 19/00 | (2006.01) |

(52) U.S. Cl.
CPC ............ *C40B 60/00* (2013.01); *B01L 3/5085* (2013.01); *C40B 50/18* (2013.01); *C40B 60/04* (2013.01); *B01J 19/0046* (2013.01); *B01J 2219/00317* (2013.01); *B01J 2219/00596* (2013.01); *B01J 2219/00637* (2013.01); *B01J 2219/00644* (2013.01); *B01J 2219/00722* (2013.01); *B01L 2200/12* (2013.01); *B01L 2300/0819* (2013.01); *B01L 2300/0893* (2013.01)

(58) Field of Classification Search
CPC ......... C40B 60/00; C40B 60/04; C40B 50/18; B01L 3/5085
See application file for complete search history.

(56) References Cited

U.S. PATENT DOCUMENTS

2011/0212463 A1* 9/2011 Delouise .......... G01N 33/54306
435/7.1

OTHER PUBLICATIONS

Cunningham et al. (J. Biomol. Screening 9(6); 2004; pp. 481-490) (Year: 2004).*

* cited by examiner

*Primary Examiner* — Jeremy C Flinders
(74) *Attorney, Agent, or Firm* — Patterson + Sheridan, LLP

(57) ABSTRACT

Embodiments described herein generally relate to biomedical devices including a porous layer forming a support structure for a biological probe and methods of making the same. The porous layer can be a porous silicon containing layer. The pore size can be adjusted such that various size biological probes can be incorporated into the pores. Further, the porous silicon containing layer can be used to support a biofunctionalizing layer.

18 Claims, 4 Drawing Sheets

POROUS SURFACE FOR BIOMEDICAL DEVICES

CROSS-REFERENCE TO RELATED APPLICATIONS

This application claims benefit of U.S. Provisional Patent Application Ser. No. 62/073,807, filed Oct. 31, 2014, which is herein incorporated by reference.

BACKGROUND

Field

Embodiments generally relate to the field of microarrays used for detecting and analyzing molecules of interest, such as biological materials.

Description of the Related Art

The detection of specific nucleic acids is an important tool for diagnostic medicine and molecular biology research. Gene probe assays currently play roles in identifying infectious organisms such as bacteria and viruses, in probing the expression of normal and mutant genes and identifying mutant genes such as oncogenes, in typing tissue for compatibility preceding tissue transplantation, in matching tissue or blood samples for forensic medicine, and for exploring homology among genes from different species. Recent advances include the fabrication of biomedical devices, such as microarrays, with gene probes incorporated therein.

Microarrays can be engineered to include probes for nucleotide sequences present in genes in humans and other organisms. In certain applications, for example, individual DNA and RNA biological probes may be attached at small locations in a geometric grid (or randomly) on a microarray support. A test sample, such as from a known person or organism, may be exposed to the grid, such that complimentary genes of fragments hybridize to probes at the individual sites in the array. The array can then be examined by scanning specific frequencies of light over the sites to identify which genes or fragments in the sample are present, by fluorescence of the sites at which genes or fragments hybridized.

In the fabrication of these biomedical devices, biofunctionalizing materials can be used in positioning and immobilizing the gene probes (also referred to as "probe adherence"). Biofunctionalizing material, when in a liquid state, often needs to be deposited into patterned regions (e.g., vias or wells). Liquid films of the biofunctionalizing material are generally deposited in a blanket fashion. Once deposited, a subsequent removal/clean step, such as chemical mechanical polishing (CMP), is needed to remove the material from the interstitial areas in between the patterned regions.

However, there are a number of difficulties in probe adherence that should be addressed. As stated above, hydrogel is used in current devices to assist in probe adherence. However, the hydrogel has limited adherence to the bottom of the well. As such, the bottom of the well must be treated to increase hydrogel adherence, such as by using a silanization process. However, the silanization process is imperfect and adherence of the hydrogel is incomplete. Further, the hydrogel is generally deposited over the entire substrate with a portion of the hydrogel being delivered into the wells. The remaining hydrogel must be removed. Currently a standard CMP process is used to remove the hydrogel, which increases processing time and can damage the substrate.

Therefore, a there is a need for improvements in probe adherence in biomedical devices.

SUMMARY

In one embodiment, a biomedical device can include a support structure; a microarray formation layer formed over the support structure, the microarray formation layer having one or more wells formed therein, each of the one or more wells having a bottom surface; a porous silicon-containing layer formed on the bottom surface of the one or more wells, the porous silicon-containing layer having an exposed surface; and a biological probe formed in connection with the exposed surface of the porous silicon-containing layer. The support structure can include a substrate; and one or more layers, the support structure being transmissive to at least one wavelength of radiation.

In another embodiment, a method of depositing a material can include positioning a support structure on a substrate support, the support structure having a first surface with the microarray formation layer formed thereon, the microarray formation layer having an exposed surface; forming one or more wells in the microarray formation layer; depositing a porous silicon-containing layer over the microarray formation layer and in the one or more wells; removing the portions of the porous silicon-containing layer from over the microarray formation layer; and depositing a biological probe in connection with the porous silicon-containing layer.

In another embodiment, a biomedical device can include a support structure, a microarray formation layer formed over the support structure, the microarray formation layer having one or more wells formed therein, each of the one or more wells having a bottom surface comprising a metal containing layer; a porous silicon-containing layer formed on the bottom surface of the one or more wells, the porous silicon-containing layer having an exposed surface; a biofunctionalizing material formed on the porous surface; and a biological probe formed on the biofunctionalizing material. The support structure can include a substrate having a first surface; a dielectric layer formed on the first surface; a color filter layer formed on the dielectric layer; a second dielectric layer formed on the color filter layer; and a metal containing layer formed on the second dielectric layer.

BRIEF DESCRIPTION OF THE DRAWINGS

So that the manner in which the above recited features of the present disclosure can be understood in detail, a more particular description of the methods and apparatus, briefly summarized above, may be had by reference to embodiments, some of which are illustrated in the appended drawings. It is to be noted, however, that the appended drawings illustrate only typical embodiments of this methods and apparatus and are therefore not to be considered limiting of its scope, for the methods and apparatus may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein provide biomedical devices incorporating porous layers to increase probe adhesion and methods of producing the same. As described herein, the biomedical device includes a substrate, a plurality of underlying layers, a microarray formation layer with one or more wells formed therein and a porous silicon-containing layer formed in at least one of the one or more wells. The porous silicon-containing layer can be used to increase adhesion between the hydrogel and the underlying metal-containing layer. Further, the porous silicon-containing layer can be used to replace the biofunctionalizing material in supporting the biological probe.

Figure 1:
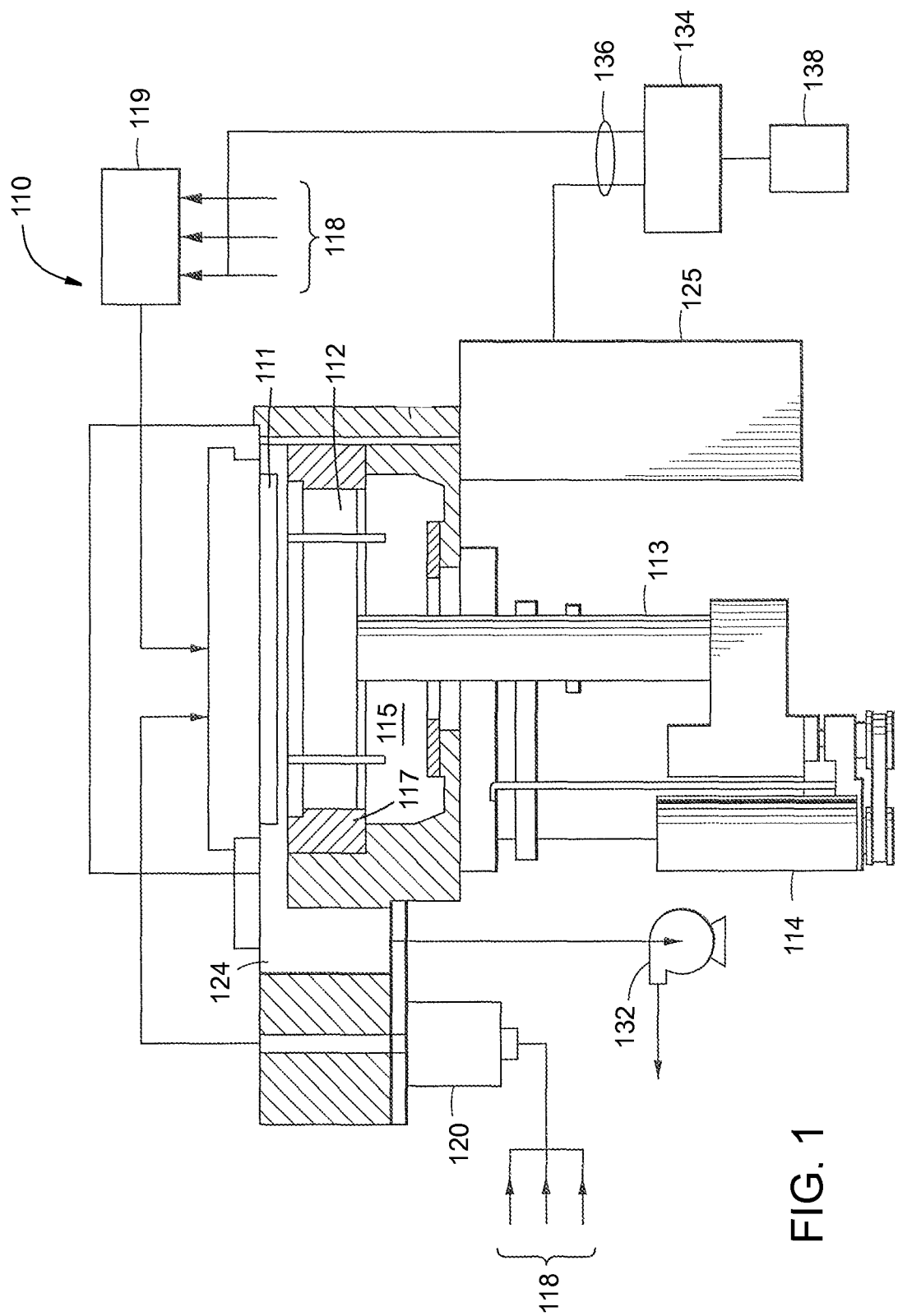
FIG. 1 is a cross-sectional diagram of a process chamber configured for use with embodiments described herein.

One suitable CVD plasma chamber in which a method of the present invention can be carried out is the "DLK" chamber available from Applied Materials, Inc. of Santa Clara, Calif., and is shown in FIG. 1, which is a vertical, cross-section view of a parallel plate chemical vapor deposition chamber 110 having a high vacuum region 115. Chamber 110 contains a gas distribution manifold 111 for dispersing process gases through perforated holes in the manifold to a substrate or substrate (not shown) that rests on a substrate support plate or substrate support 112 which is raised or lowered by a lift motor 114. A liquid injection system (not shown), such as for liquid injection of TEOS, can also be provided for injecting a liquid reactant. Exemplary liquid injection systems include the AMAT Gas Precision Liquid Injection System (GPLIS) and the AMAT Extended Precision Liquid Injection System (EPLIS), both available from Applied Materials, Inc. of Santa Clara, Calif.

The chamber 110 can include heating of the process gases and substrate, such as by resistive heating coils (not shown) or external lamps (not shown). Referring to FIG. 1, substrate support 112 is mounted on a support stem 113 so that substrate support 112 (and the substrate supported on the upper surface of substrate support 112) can be controllably moved between a lower loading/off-loading position and an upper processing position which is closely adjacent to manifold 111.

When substrate support 112 and the substrate are in processing position 114, they are surrounded by an insulator 117 and process gases exhaust into a manifold 124. During processing, gases inlet to the gas distribution manifold 111 are uniformly distributed radially across the surface of the substrate. A vacuum pump 132 having a throttle valve controls the exhaust rate of gases from the chamber.

Before reaching the gas distribution manifold 111, deposition and carrier gases are input through gas lines 118 into a mixing system 119 where they are combined and then sent to the gas distribution manifold 111. An optional microwave system 150 having an applicator tube 120 may be located on the input gas line for the oxidizing gas to provide additional energy that dissociates only the oxidizing gas prior to entry to the chamber 110. The microwave applicator provides a power from between about 0 and about 6000 W. Generally, the process gases supply lines 118 for each of the process gases include (i) safety shut-off valves (not shown) that can be used to automatically or manually shut off the flow of process gas into the chamber, and (ii) mass flow controllers (also not shown) that measure the flow of gas through the gas supply lines. When toxic gases are used in the process, several safety shut-off valves are positioned on each gas supply line in conventional configurations.

The deposition process performed in chamber 110 can be either a non-plasma process on a cooled substrate pedestal or a plasma enhanced process. In a plasma process, a controlled plasma is typically formed adjacent to the substrate by RF energy applied to the gas distribution manifold 111 from RF power supply 125 (with substrate support 112 grounded). Alternatively, RF power can be provided to the substrate support 112 or RF power can be provided to different components at different frequencies. RF power supply 125 can supply either single or mixed frequency RF power to enhance the decomposition of reactive species introduced into the high vacuum region 115. A mixed frequency RF power supply typically supplies power at a high RF frequency (RF1) of about 13.56 MHz to the gas distribution manifold 111 and at a low RF frequency (RF2) of about 360 KHz to the substrate support 112. The silicon oxide layers can be produced using low levels or pulsed levels of high frequency RF power. Pulsed RF power can provide 13.56 MHz RF power at about 20 to about 200 W during about 10% to about 30% of the duty cycle. Non-pulsed RF power can provide 13.56 MHz RF power at about 10 to about 150 W. Low power deposition can occur at a temperature range from about −20 degrees Celsius to about 40 degrees Celsius. Using the above temperature range, the deposited film is partially polymerized during deposition and polymerization is completed during subsequent curing of the film.

When additional dissociation of the oxidizing gas is desired, an optional microwave chamber can be used to input from about 0 W to about 3000 W of microwave power to the oxidizing gas prior to entering the deposition chamber. Separate addition of microwave power would avoid excessive dissociation of the silicon compounds prior to reaction with the oxidizing gas. A gas distribution plate having separate passages for the silicon compound and the oxidizing gas can be employed when microwave power is added to the oxidizing gas.

The lift motor 114 raises and lowers substrate support 112 between a processing position and a lower, substrate-loading position. The motor, the gas mixing system 119, and the RF power supply 125 are controlled by a system controller 134 over control lines 136. The chamber includes analog assemblies, such as mass flow controllers (MFCs) and standard or pulsed RF generators, that are controlled by the system controller 134 which executes system control software stored in a memory 210, such as a hard disk drive. Motors and optical sensors are used to move and determine the position of movable mechanical assemblies such as the throttle valve of the vacuum pump 132 and motor for positioning the substrate support 112.

The nano-porous silicon oxide layer is produced by plasma enhanced (PECVD) or microwave enhanced chemical vapor deposition of a silicon/oxygen containing material that optionally contains thermally labile organic groups, and by controlled annealing of the deposited silicon/oxygen containing material to form microscopic gas pockets that are uniformly dispersed in a silicon oxide layer. The relative volume of the microscopic gas pockets to the silicon oxide layer can be controlled to maintain a closed cell foam structure that provides low dielectric constants after annealing. The nano-porous silicon oxide layers will have dielectric constants less than about 2.5, such as less than about 2.0.

FIGS. 2A-2F depict a process sequence to form a biomedical device 200 with a porous material, such as a porous silicon-containing layer 212, deposited in a plurality of wells 210, according to an embodiment. The biomedical device 200 shown includes a substrate 202. The substrate 202 can have any composition useable for biomedical device applications, such as a silicon, epoxy or quartz substrate. In one example, the substrate 202 is substantially composed of silicon. The substrate 202 can be of a broad range of dimensions (e.g., length, width, shape, thickness, etc). In one example, the substrate is either a 200 millimeter (mm) substrate or a 300 mm substrate. In another example, the substrate is a glass slide of a typical 96 well plate formfactor (e.g., about 85 mm by about 127 mm). In another example, the substrate can be any number of dimensions to optimize production of the device (e.g., Gen 2 LCD glass with dimensions of about 360 mm by about 465 mm).

Figure 2A:
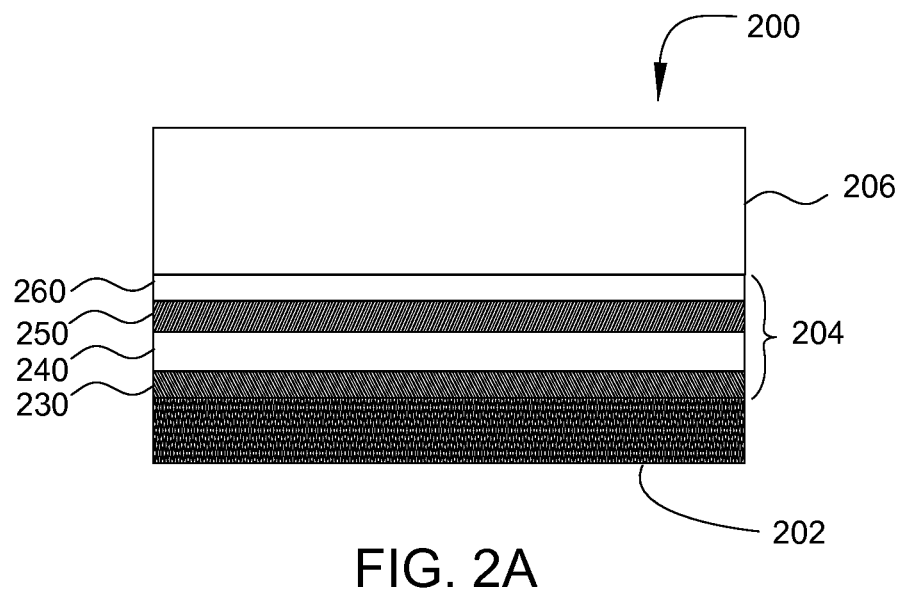
FIGS. 2A-2F depict the deposition of a porous layer in a biomedical device, according to an embodiment.

FIG. 2A depicts early stage formation of a biomedical device 200 including the substrate 202 with a plurality of layers 204 formed thereon. The plurality of layers 204 includes a first layer 230, a second layer 240, a third layer 250 and a fourth layer 260. The first layer 230 is a dielectric layer, such as a silicon oxide layer, a silicon nitride layer, a silicon oxynitride or others. The first layer 230 can be deposited using a chemical vapor deposition process, such as plasma enhanced chemical vapor deposition (PE-CVD). The second layer 240 is a color filter layer. The color filter layer may be composed of a material which is transparent to at least one wavelength of light while being opaque to at least one wavelength of light. The third layer 250 is a dielectric layer, such as a silicon oxide layer, a silicon nitride layer, a silicon oxynitride or others. The third layer 250 can be deposited using methods similar to the first layer 230, such as by PE-CVD. The third layer 250 is deposited at low temperatures (LT). In one example, LT layers, such as the third layer 250, are deposited at a temperature of less than about 100 degrees Celsius. In another example, LT layers are deposited at a temperature low enough that the second layer 240 is not damaged. The fourth layer 260 is a metal-containing layer, such as a tantalum oxide layer, a tungsten oxide layer, a hafnium oxide layer or others. The metal-containing layer can be deposited by deposition techniques known in the art. In one example, a tantalum oxide layer is deposited using atomic layer deposition (ALD). The plurality of layers 204 may include any composition used in the formation of a biomedical device, such as metals or dielectrics.

Figure 2B:
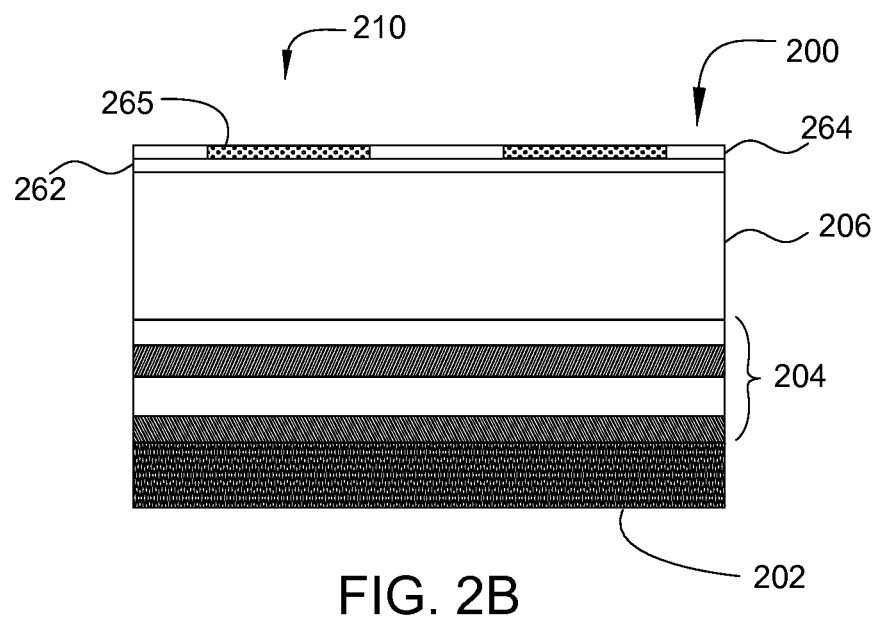

FIG. 2B depicts the substrate 202 with a dielectric layer 206 formed over the plurality of layers 204. The dielectric layer 206 can be made of a dielectric material, such as silicon nitride. The dielectric layer 206 is etched or otherwise processed to form one or more openings therein to define a plurality of wells 210. The dielectric layer 206 can be etched using known etching techniques compatible with the materials and feature dimensions. The dielectric layer is shown here as having a hardmask 262 and a photoresist 264 formed thereover to provide the pattern for etching the dielectric layer 206. The photoresist 264 receives radiation which creates one or more susceptible portions 265 of the photoresist 264, shown here as two susceptible portions 265. The susceptible portions 265 are susceptible to etching by one or more etchants (not shown). The etchants are then delivered to etch the photoresist 264, the hardmask 262 and the dielectric layer 204, which forms a plurality of wells 210. The plurality of wells 210 can each have a width or diameter of less than 3 µm, such as a well of about 1 µm in width or diameter.

With the plurality of wells 210 formed, the hardmask 262 and the photoresist 264 can then be removed. In further embodiments, the hardmask 262 and the photoresist 264 may be left in position on the exposed surface of the dielectric layer 206. In this way, the removal of the hardmask 262 and the photoresist 264 can be used to remove excess secondary material. One example is presented with reference to FIG. 2E.

Figure 2C:
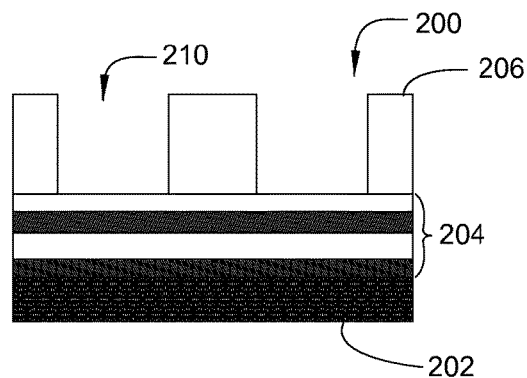

FIG. 2C depicts the substrate 202 with the dielectric layer 206 having the plurality of wells 210 formed therein. The plurality of wells 210 can have a width of less than 3 µm, such as an opening of about 1 µm. The plurality of wells 210 can be a variety of shapes, such as cylindrical.

The plurality of wells 210 form the boundaries for the deposition of other biological components and form the environment in which biological investigations can be conducted. Biological components can include polynucleotides and whole cell lysates, among others. In this example, the plurality of wells 210 extend through the dielectric layer 206 and stop at the fourth layer 260.

Figure 2D:
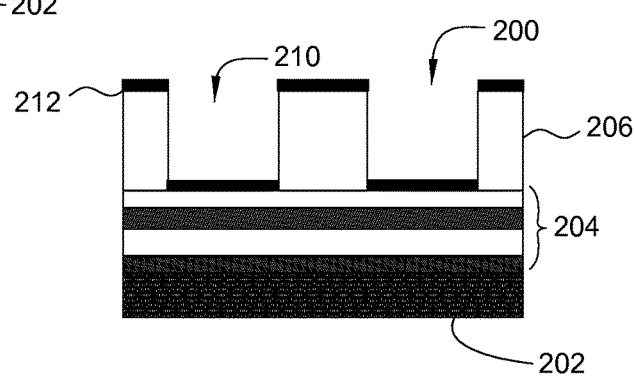

FIG. 2D depicts the biomedical device 200 with a porous silicon-containing layer 212 formed over the upper surface of the dielectric layer 206 and the bottom surface of the wells 210. The porous silicon-containing layer 212 can be a porous silicon-containing layer, such as a porous silicon/oxygen material. The porous silicon/oxygen material can be chemical vapor deposited by reacting an oxidizable silicon containing compound or mixture comprising an oxidizable silicon component and an unsaturated non-silicon bearing component having thermally labile groups with an oxidizing gas. The oxidizing gases are oxygen ($O_2$) or oxygen containing compounds such as nitrous oxide ($N_2O$), ozone ($O_3$), and carbon dioxide ($CO_2$), such as $N_2O$ or $O_2$.

Oxygen and oxygen containing compounds can be dissociated to increase reactivity, such as to achieve a desired carbon content in the deposited film. RF power can be coupled to the deposition chamber to increase dissociation of the oxidizing compounds. The oxidizing compounds may also be dissociated in a microwave chamber prior to entering the deposition chamber to reduce excessive dissociation of the silicon containing compounds. Deposition of the silicon oxide layer can be continuous or discontinuous. Although deposition can occur in a single deposition chamber, this is not intended to be limiting. The layer can also be deposited sequentially in two or more deposition chambers. Furthermore, RF power can be cycled or pulsed to reduce heating of the substrate and promote greater porosity in the deposited film.

The oxidizable silicon component of the oxidizable silicon containing compound or mixture comprises organosilane or organosiloxane compounds which generally include the structure:

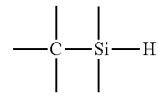

wherein each Si is bonded to at least one hydrogen atom and may be bonded to one or two carbon atoms, and C is included in an organo group, such as alkyl or alkenyl groups such as —$CH_3$, —$CH_2$—$CH_3$, —$CH_2$—, or —$CH_2$—$CH_2$—, or fluorinated carbon derivatives thereof. When an organosilane or organosiloxane compound includes two or more Si atoms, each Si is separated from another Si by —O—, —C—, or —C—C—, wherein each bridging C is included in an organo group, such as alkyl or alkenyl groups such as —$CH_2$—, —$CH_2$—$CH_2$—, —$CH(CH_3)$—, —$C(CH_3)_2$—, or fluorinated carbon derivatives thereof. The organosilane and organosiloxane compounds are gases or liquids near room temperature and can be volatilized above about 10 Torr. Suitable silicon containing compounds include:

methylsilane, $CH_3$—$SiH_3$
dimethylsilane, $(CH_3)_2$—$SiH_2$
disilanomethane, $SiH_3$—$CH_2$—$SiH_3$
bis(methylsilano)methane, $CH_3$—$SiH_2$—$CH_2$—$SiH_2$—$CH_3$
2,4,6-trisilaoxane —(—$SiH_2$—$CH_2$—$SiH_2$—$CH_2$—$SiH_2$—O—)— (cyclic)
cyclo-1,3,5,7-tetrasilano-2,6-dioxy-4,8-dimethylene —(—$SiH_2$—$CH_2$—$SiH_2$—O—)$_2$— (cyclic)
1,3,5-trisilacyclohexane, —(—$SiH_2$—$CH_2$—)$_3$— (cyclic)
1,3-dimethyldisiloxane, $CH_3$—$SiH_2$—O—$SiH_2$—$CH_3$
1,1,3,3-tetramethyldisiloxane $(CH_3)_2$—SiH—O—SiH—$(CH_3)_2$
1,1,5,5-tetramethyltrisiloxane, and $(CH_3)_2$—SiH—O—$SiH_2$—O—SiH—$(CH_3)_2$
1,1,3,5,5-pentamethyltrisiloxane $(CH_3)_2$—SiH—O—SiH $(CH_3)$—O—SiH—$(CH_3)_2$ and fluorinated carbon derivatives thereof, such as 1,2-disilanotetrafluoroethane. The hydrocarbon groups in the organosilanes and organosiloxane may be partially or fully fluorinated to convert C—H bonds to C—F bonds. Many of the organosilane and organosiloxane compounds are commercially available. A combination of two or more of the organosilanes or organosiloxanes can be employed to provide a blend of desired properties such as dielectric constant, oxide content, hydrophobicity, film stress, and plasma etching characteristics.

When the oxidizable silicon component forms a compound with an unsaturated non-silicon bearing component having thermally labile groups, the organosilane or organosiloxane compound are functional groups possessing both a silicon oxygen bond and a silicon-hydrogen bond. Exemplary functional groups include:

methylsiloxy, and ($CH_3$—$SiH_2$—O—)
dimethylsiloxy (($CH_3)_2$—SiH—O—)

The unsaturated non-silicon bearing component having thermally labile groups has the property of reacting with an plasma-sustained oxidizing environment to form thermally labile molecules that deposit, and which, when subsequently exposed to elevated temperatures, thermally decompose to form volatile species with low boiling points. Decomposition and evolution of the thermally labile group's volatile species from the deposited film will leave voids in the structure, reducing the structure's density. Selectively removing embedded chemically reacted solid material within the deposited film by a thermal process results in low density films which have low dielectric constants. Formation of voids using some compounds such as 2,4,6-trisilaoxane (2,4,6-trisilatetrahydropyran) and cyclo-1,3,5,7-tetrasilano-2,6-dioxy-4,8-dimethylene is achieved during annealing without addition of labile groups by virtue of a non-planar ring structure:

1,3,5,7-tetrasilano-2,6-dioxy-4,8-dimethylene, and —(—$SiH_2$—$CH_2$—$SiH_2$—O—)$_2$— (cyclic)
2,4,6-trisilatetrahydropyran, —$SiH_2$—$CH_2$—$SiH_2$—$CH_2$—$SiH_2$—O— (cyclic)

The thermally labile organic groups contain sufficient oxygen to form gaseous products when the silicon oxide layer is annealed.

When the oxidizable silicon component forms a compound with an unsaturated non-silicon bearing component having thermally labile groups, thermally labile groups can include non-silicon containing multiply unsaturated cycloalkanes (having two or more carbon-carbon double bonds), including heterocyclodialkenes, with oxygen or nitrogen incorporated within the molecular structure, and which generally tend to perform favorably in plasma environments. Exemplary labile groups include:

Dioxin, $C_4H_4O_2$, —(—CH=CH—O—CH=CH—O—)—, cyclic
Furan, $C_4H_4O$, —(—CH=CH—CH=CH—O—)—, cyclic
Fulvene, $C_6H_6$, —(—CH=CH—CH=CH—C($CH_2$)—)—, cyclic Oxidizable silicon containing compounds comprising the oxidizable silicon component and the thermally labile groups include:

methylsilyl-1,4-dioxinyl ether $CH_3$—$SiH_2$—O—($C_4H_3O_2$)
2-methylsiloxanyl furan —(—CH=CH—CH=C(O—$SiH_2$—$CH_3$)—O—)—, cyclic
3-methylsiloxanyl furan —(—CH=CH—C(O—$SiH_2$—$CH_3$)=CH—O—)—, cyclic
2,5-bis(methylsiloxy)-1,4-dioxin —(—CH=C(O—$SiH_2$—$CH_3$)—O—CH=C(O—$SiH_2$—$CH_3$)—O—)—, cyclic
3,4-bis(methylsiloxanyl)furan —(—CH=C(O—$SiH_2$—$CH_3$)—C(O—$SiH_2$—$CH_3$)=CH—O—)—, cyclic
2,3-bis(methylsiloxanyl)furan —(—CH=CH—C(O—$SiH_2$—$CH_3$)=C(O—$SiH_2$—$CH_3$)—O—)—, cyclic
2,4-bis(methylsiloxanyl)furan —(—CH=C(O—$SiH_2$—$CH_3$)—CH=C(O—$SiH_2$—$CH_3$)—O—)—, cyclic
2,5-bis(methylsiloxanyl)furan —(—C(O—$SiH_2$—$CH_3$)=CH—CH=C(O—$SiH_2$—$CH_3$)—O—)—, cyclic
1-methylsiloxanylfulvene —(—CH=CH—CH=CH—C(CH(O—$SiH_2$—$CH_3$))—)—, cyclic
2-methylsiloxanylfulvene —(—CH=CH—CH=CH—C($CH_2$)(O—$SiH_2$—$CH_3$)—)—, cyclic
6-methylsiloxanylfulvene —(—C(O—$SiH_2$—$CH_3$)=CH—CH=CH—C=CH—)—, cyclic
bis(methylsiloxanyl)fulvene $(C_6H_4)$(O—$SiH_2$—$CH_3$)$_2$,
dimethylsilyl-1,4-dioxinyl ether $(CH_3)_2$—SiH—O—($C_4H_3O_2$),
2-dimethylsiloxanyl furan —(—CH=CH—CH=C(O—SiH—$(CH_3)_2$)—O—)—, cyclic
3-dimethylsiloxanyl furan —(—CH=CH—C(O—SiH—$(CH_3)_2$)=CH—O—)—, cyclic
2,5-bis(dimethylsiloxy)-1,4-dioxin —(—CH=C(O—SiH—$(CH_3)_2$)—O—CH=C(O—SiH—$(CH_3)_2$)—O—)—, cyclic
3,4-bis(dimethylsiloxanyl)furan —(—CH=C(O—SiH—$(CH_3)_2$)—C(O—SiH—$(CH_3)_2$)=CH—O—)— cyclic
2,3-bis(dimethylsiloxanyl)furan —(—CH=CH—C(O—SiH—$(CH_3)_2$)=C(O—SiH—$(CH_3)_2$)—O—)— cyclic
2,4-bis(dimethylsiloxanyl)furan —(—CH=C(O—SiH—$(CH_3)_2$)—CH=C(O—SiH—$(CH_3)_2$)—O—)— cyclic
2,5-bis(dimethylsiloxanyl)furan —(—C(O—SiH—$(CH_3)_2$)=CH—CH=C(O—SiH—$(CH_3)_2$)—O—)— cyclic
1-dimethylsiloxanylfulvene —(—CH=CH—CH=CH—C(CH(O—SiH—$(CH_3)_2$))—)—, cyclic
2-dimethylsiloxanylfulvene —(—CH=CH—CH=CH—C($CH_2$)(O—SiH—$(CH_3)_2$)—)—, cyclic
6-dimethylsiloxanylfulvene —(—C(O—SiH—$(CH_3)_2$)=CH—CH=CH—C=CH—)—, cyclic
bis(dimethylsiloxanyl)fulvene $(C_6H_4)$(O—SiH—$(CH_3)_2$)$_2$, and fluorinated carbon derivatives thereof. In some embodiments, the compounds are liquid at room temperature and can be volatilized near a pressure of 10 Torr or above. Such compounds react with an oxidizing gas to form a gel-like silicon/oxygen containing material that retains many of the labile organic groups at temperatures below about 50° C.

The amount of labile organic groups retained in the deposited silicon/oxygen containing material can be increased by mixing the reactive compounds with non-silicon containing components that comprise one or more labile organic groups. The labile organic groups include the dioxan, furan, and fulvene derivative chemicals described for the silicon containing reactive compounds and other oxygen containing organic groups. The labile organic groups can be the silicon containing and non-silicon containing components incorporated in the same molecule, but with the methylsilyl or methylsiloxanyl groups replaced with vinyl groups, or with the methylsiloxanyl groups replaced with ester groups, or with the methylsiloxanyl groups replaced with other non-silicon containing organic groups, in addition to those chemicals without the methylsiloxanyl groups, such as 1,4-dioxin and furan. Exemplary non-silicon containing multiply unsaturated cycloalkanes (having two or more carbon-carbon double bonds) include:

vinyl-1,4-dioxinyl ether $CH_2=CH-O-(C_4H_3O_2)$,
vinyl furyl ether $CH_2=CH-O-(C_4H_3O)$,
vinyl-1,4-dioxin $CH_2=CH-(C_4H_3O_2)$,
vinyl furan $CH_2=CH-O-(C_4H_3O)$,
methyl furoate $CH_3C(O)-O-(C_4H_3O)$,
furyl formate $(C_4H_3O)-COOH$,
furyl acetate $(C_4H_3O)-CH_2COOH$,
furaldehyde $CH(O)-(C_4H_3O)$,
difuryl ketone $(C_4H_3O)_2C(O)$, cyclic
difuryl ether $(C_4H_3O)-O-(C_4H_3O)$, cyclic
difurfuryl ether $(C_4H_3O)-CH_2-O-CH_2-(C_4H_3O)$, cyclic
furan, $C_4H_4O$, (cyclic)
1,4-dioxin, $C_4H_4O_2$, (cyclic)
and fluorinated carbon derivatives thereof.

The non-silicon containing components can alternatively be mixed with the reactive silicon containing materials that do not contain labile organic groups, such as:
methylsilane, $CH_3-SiH_3$
dimethylsilane, $(CH_3)_2-SiH_2$
disilanomethane, $SiH_3-CH_2-SiH_3$
bis(methylsilano)methane, $CH_3-SiH_2-CH_2-SiH_2-CH_3$
2,4,6-trisilaoxane $-(-SiH_2-CH_2-SiH_2-CH_2-SiH_2-O-)-$ (cyclic)
1,3,5-trisilacyclohexane, $-(-SiH_2CH_2-)_3-$ (cyclic)
cyclo-1,3,5,7-tetrasilano-2,6-dioxy-4,8-dimethylene $-(-SiH_2-CH_2-SiH_2-O-)_2-$ (cyclic)
1,3-dimethyldisiloxane, $CH_3-SiH_2-O-SiH_2-CH_3$
1,1,3,3-tetramethyldisiloxane $(CH_3)_2-SiH-O-SiH-(CH_3)_2$
1,1,5,5-tetramethyltrisiloxane, and $(CH_3)_2-SiH-O-SiH_2-O-SiH-(CH_3)_2$
1,1,3,5,5-pentamethyltrisiloxane $(CH_3)_2-SiH-O-SiH(CH_3)-O-SiH-(CH_3)_2$
and the fluorinated carbon derivatives thereof.

A combination of thermally-labile-imparting and non-thermally-labile-imparting compounds can be co-deposited to tailor film properties. An exemplary embodiment of the co-deposition compounds include a thermally-labile-imparting compound selected from either methylsilyl-1,4-dioxinyl ether or 2-methylsiloxanyl furan and a non-thermally-labile-imparting compound selected from either 2,4,6-trisilaoxane (2,4,6-trisilatetrahydropyran) or cyclo-1,3,5,7-tetrasilano-2,6-dioxy-4,8-dimethylene.

The co-deposited heteroalicyclic non-thermally-labile imparting molecules which can be used advantageously are non-planar cyclic molecules with insignificant ring strain and which deposit in random orientations. For 2,4,6-trisilaoxane and cyclo-1,3,5,7-tetrasilano-2,6-dioxy-4,8-dimethylene, the dual bonding of the silyl functional groups to the methylene groups can provide improved thermal stability and better mechanical properties of the resultant film. The non-planar molecule can provide a relatively reduced stack density within the deposited film, thereby producing low dielectric films.

After the silicon/oxygen containing material is deposited as a film, the film can be annealed at a gradually increasing temperature to convert the labile organic groups to dispersed gas pockets, thus creating a nano-porous silicon oxide layer (the porous silicon-containing layer 212). The deposited layer can have a thickness and porosity that allows for binding the metal-containing layer 260 which simultaneously offering a support surface to either the biological probe, the biofunctionalizing material, or combinations thereof.

Though described here as being a silicon oxide layer formed using a thermally labile oxidizing gas, this is not intended to be limiting. In other embodiments, a silicon layer can be epitaxially grown using a silicon containing gas, where the deposited layer is doped with high energy hydrogen. The hydrogen can be implanted at a power of about 1 kV to to about 3 kV as the silicon layer is grown. Other porous layers, or porous silicon-containing layers, may function as a structural support for the biological probes, in the embodiments described herein. Further, the transmission of radiation can be altered by doping the deposited layer. Dopants which can be used to change the transmissivity of the porous silicon-containing layer 212 include carbon, nitrogen, boron and helium. The transmissivity of the porous silicon-containing layer 212 can be altered such that radiation of the appropriate wavelength is at least about 90% transmitted through the porous silicon-containing layer 212, such as at least about 95%. Further deposition and doping strategies can be employed to adjust Ph resistance, growth speed, pore size and other parameters as desired by the user.

Figure 2E:
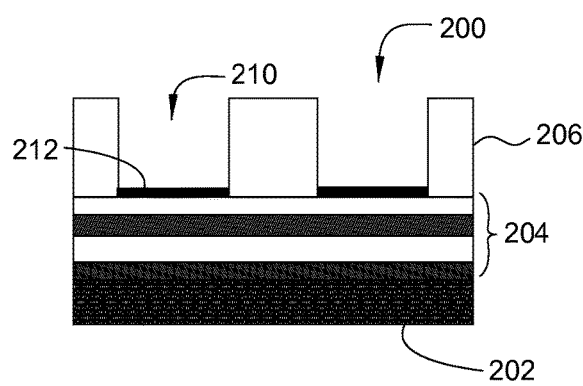

FIG. 2E depicts the biomedical device 200 with the porous silicon-containing layer 212 removed from the exposed surface of the dielectric layer 206. The porous silicon-containing layer 212 is generally deposited conformally across the exposed surfaces which are perpendicular to the gas flow (e.g., the bottom surface of the wells 210 and the exposed surface of the dielectric layer 206). In one embodiment, the porous silicon-containing layer 212 can be removed from the dielectric layer 206 using chemical mechanical polishing (CMP). Generally, CMP includes at least a polishing pad which is used to gently abrade the surface and physically remove the porous silicon-containing layer 212 from the dielectric layer 206. In another embodiment, the porous silicon-containing layer 212 is removed from the upper surface of the dielectric layer 206 by removing the underlying hardmask 262 and the photoresist 264. In this embodiment, a plasma such as an oxygen-containing plasma, is used to remove the remaining portions of the hardmask 262 and the photoresist 264 from the upper surface of the dielectric layer 206. By removing the hardmask 262 and the photoresist 264, the porous silicon-containing layer 212 will also be removed.

Figure 2F:
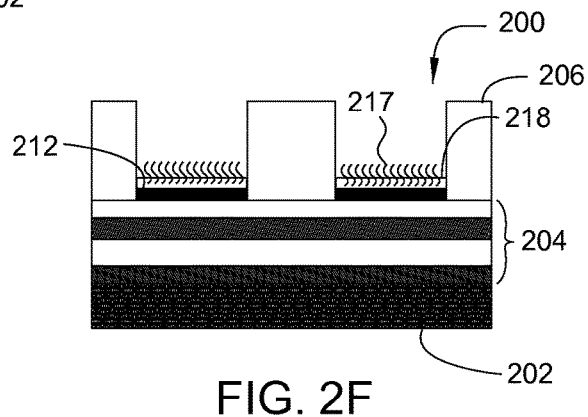

FIG. 2F depicts the biomedical device 200 with a biofunctionalizing material 218 formed over the porous silicon-containing layer 212 on the bottom of a well 210. The biofunctionalizing material 218 can be delivered through the printing mask 106 and into the plurality of wells 210. The biofunctionalizing material 218, can be delivered by a number of methods, such as through the screen printing, conformal deposition and subsequent polish or others such that the biofunctionalizing material 218 is delivered into the well 210. The biofunctionalizing material 218 can include hydrogels (e.g., polyacrylamide gel) or other materials which provide structure or function to a biomedical device. The biofunctionalizing material 218 can further provide support to a biological probe 217 (shown here as embedded into biofunctionalizing material 218). The biological probe 217 includes biologically active materials used in a variety of detection methods, such as polynucleotides (e.g., deoxyribonucleic acid (DNA), messenger ribonucleic acid (RNA), etc.), or polynucleotide precursors (e.g., nucleotide triphosphates, primers, etc.).

Figure 3:
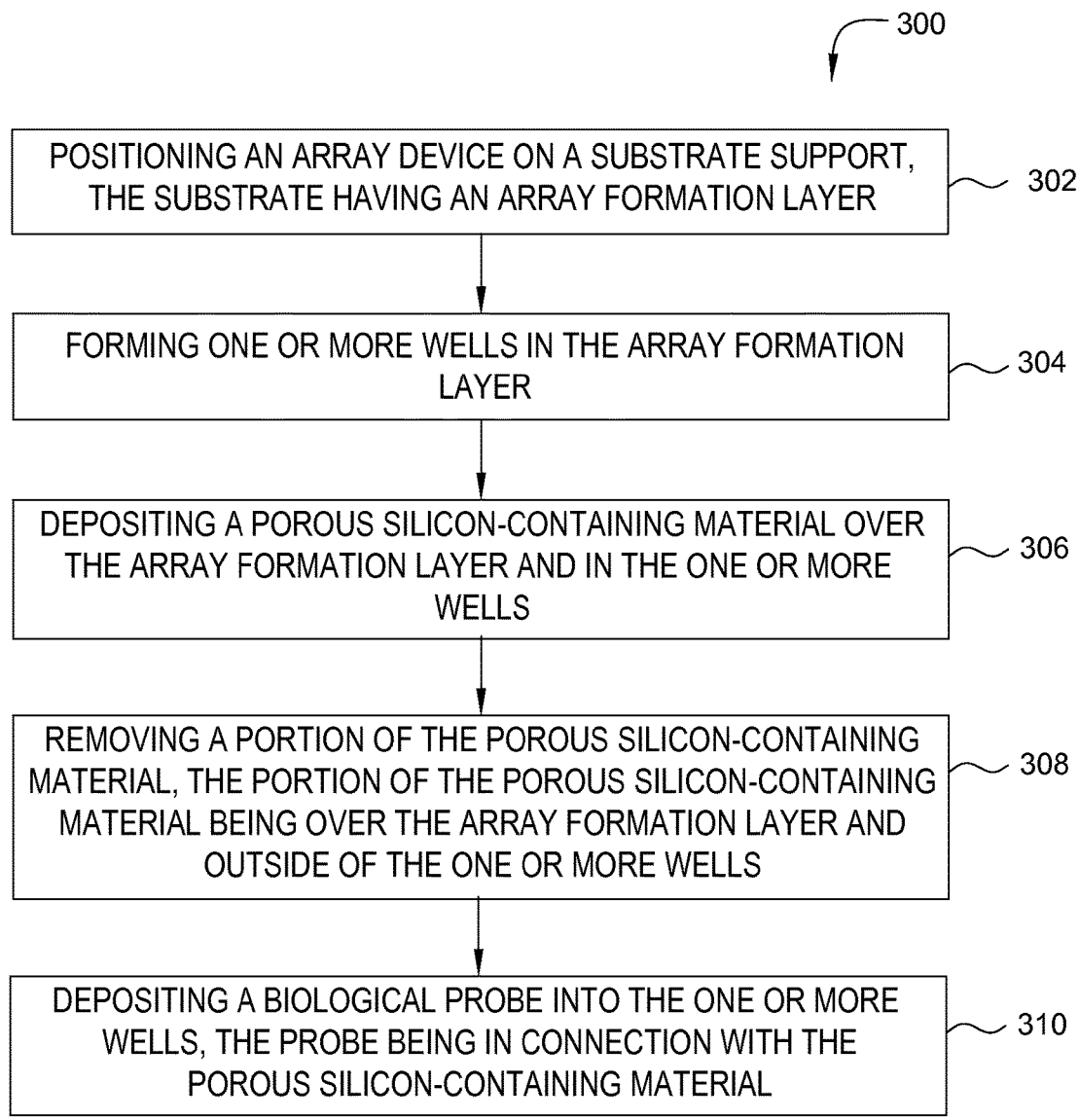
FIG. 3 is a block diagram of a method for deposition of a porous layer, according to an embodiment.

FIG. 3 is a block diagram describing a method 300 for deposition a porous silicon-containing layer, according to an embodiment. The silicon-containing material acts as a structural support for the biofunctionalizing material or the biological probe. The use of the porous silicon-containing layer can increase binding efficiency of the biofunctionalizing material or act to bind the biological probe directly (without the use of the biofunctionalizing material). The method 300 includes positioning an array device on a substrate support, at 302; forming one or more wells in the microarray formation layer, at 304; depositing a porous silicon-containing layer over the microarray formation layer and in the one or more wells, at 306; removing a portion of the porous silicon-containing layer, the portion of the porous silicon-containing layer being over the microarray formation layer and outside of the one or more wells, at 308; and depositing a biological probe into the one or more wells, the biological probe being in connection with the porous silicon-containing layer, at 310.

The method 300 begins by positioning a positioning an array device on a substrate support, at 302. The substrate support is part of or positioned in a process chamber. The substrate support and the process chamber can be the substrate support 112 and the process chamber 110, described with reference to FIG. 1. The biomedical device 200 corresponds to the biomedical device 200, depicted in FIGS. 2A-2F.

The substrate has a plurality of layers disposed thereon. The plurality of layers is described with reference to FIG. 2A-2F as four layers. The upper layer of the plurality of layers has a first surface. The first surface has a microarray formation layer formed thereon, the microarray formation layer has an exposed surface. The dielectric layer described more clearly with reference to FIG. 2A-2F is a type of array formation layer. More generally, the microarray formation layer is a layer which provides structural support for the wells, the wells acting to hold the biological probe, the biofunctionalizing material or combinations thereof.

One or more wells are formed in the microarray formation layer, at 304. As described above, a standard photolithography process employing a photoresist, a hardmask and an etchant can be used to form the wells in the microarray formation layer. Though not expressly disclosed here, other methods of forming a well can be used with embodiments described herein. As described above, the photoresist and the hardmask may be left in place or they may be removed prior to performing any subsequent action of the method.

A porous silicon-containing layer can then be deposited over the microarray formation layer and in the one or more wells, at 306. The porous silicon-containing layer can be deposited in a substantially similar fashion as the porous silicon-containing layer described with reference to FIG. 2B. The deposition process will deposit the porous silicon-containing layer in a substantially conformal fashion over parallel surfaces to the gas flow (e.g., the upper surface of the microarray formation layer and the bottom surface of the one or more wells).

A portion of the porous silicon-containing layer can then be removed, the portion of the porous silicon-containing layer being over the microarray formation layer and outside of the one or more wells, at 308. The porous silicon-containing layer is believed to provide structural support for biological probes. As such, to avoid improper placement of the biological probes, the porous silicon-containing layer should be removed from the upper surfaces of the array support layer. The porous silicon-containing layer can be removed by methods described above with reference to FIG. 2A-2F.

A biological probe is the deposited into the one or more wells, the biological probe being in connection with the porous silicon-containing layer, at 310. The biological probe can be deposited alone or in conjunction with a biofunctionalizing material. The biofunctionalizing material may be delivered to the surface of the printing mask. The material may be delivered by jetting or otherwise flowing the material to the surface of the array support layer and into the wells. The biofunctionalizing material will then enter into the pores of the porous silicon-containing layer to firmly adhere a biofunctionalizing material to the bottom surface of the one or more wells. The biofunctionalizing material is a material used to provide a contact surface and buffer zone for biological materials, such as polynucleotides. In one example, the biofunctionalizing material is a hydrogel. In further examples, the biofunctionalizing material is a biological material, such as a polynucleotide, which is synthesized or incorporated into the lower surface of the well. In preparing solid-supported molecular arrays using a biofunctionalizing material, a biofunctionalizing material, such as hydrogel, is formed and molecules displayed from it. The formation of the hydrogel and construction of the array may be effected sequentially or simultaneously.

Where the hydrogel is formed prior to formation of the array, it is typically produced by allowing a mixture of co-monomers to polymerize. Generally, the mixture of co-monomers contain acrylamide and one or more co-monomers, the latter of which permit, in part, subsequent immobilization of molecules of interest so as to form the molecular array. The co-monomers used to create the hydrogel typically contain a functionality that serves to participate in crosslinking of the hydrogel and/or immobilize the hydrogel to the solid support and facilitate association with the target molecules of interest.

Either with or without the biofunctionalizing material, biological probes can be deposited into the well in connection with the porous silicon-containing layer. Biological probes are any number of a variety of biological materials used in the analysis of an unknown biological sample, including but not limited to polynucleotides. Polynucleotides (and other molecules) can be displayed on the surface of solid support through the use of hydrogel. Molecular arrays, e.g. microarrays, of molecules, particularly polynucleotides, are of use in techniques including nucleic acid amplification and sequencing methods.

As used herein, the term "polynucleotide" refers to nucleic acids in general, including DNA (e.g. genomic DNA, cDNA), RNA (e.g. mRNA), synthetic oligonucleotides and synthetic nucleic acid analogs. Polynucleotides may include natural or non-natural bases, or combinations thereof and natural or non-natural backbone linkages, e.g. phosphorothioates, PNA or 2'-O-methyl-RNA, or combinations thereof. The biological materials are immobilized by the porous silicon-containing layer, such that the polynucleotides are unbound, exposed and widely distributed, thus allowing the polynucleotides to bind the complimentary DNA or RNA.

While the foregoing is directed to embodiments of the present methods and apparatus, other and further embodiments of the methods and apparatus may be devised without departing from the basic scope thereof, and the scope thereof is determined by the claims that follow.

What is claimed is:

1. A biomedical device, comprising:
    a support structure, the support structure comprising:
        a substrate; and
        one or more layers on the substrate, the support structure being transmissive to at least one wavelength of radiation;
    a microarray formation layer formed over the support structure, wherein the microarray formation layer is a silicon nitride layer, and the microarray formation layer has one or more wells formed therein, each of the one or more wells having a bottom surface;
    a porous silicon-containing layer formed on the bottom surface of the one or more wells, the porous silicon-containing layer having an exposed surface; and
    a biological probe positioned in connection with the exposed surface of the porous silicon-containing layer.

2. The biomedical device of claim 1, further comprising a biofunctionalizing material positioned on the exposed surface of the porous silicon-containing layer.

3. The biomedical device of claim 2, wherein the biofunctionalizing material is a hydrogel.

4. The biomedical device of claim 1, wherein the one or more layers comprise:
    a dielectric layer formed on the first surface;
    a color filter layer formed on the dielectric layer;
    a second dielectric layer formed on the color filter layer; and
    a metal containing layer formed on the second dielectric layer.

5. The biomedical device of claim 4, wherein the metal containing layer comprises TaN.

6. The biomedical device of claim 1, wherein the porous silicon-containing layer is doped with boron, nitrogen, carbon, helium or combinations thereof.

7. The biomedical device of claim 1, wherein the porous silicon-containing layer is transparent to at least one wavelength of radiation which is shared with the one or more layers.

8. The biomedical device of claim 1, wherein the porous silicon-containing layer is a doped silicon oxide layer.

9. The biomedical device of claim 1, wherein the biological probe is a polynucleotide.

10. A biomedical device, comprising:
    a support structure, the support structure comprising:
        a substrate having a first surface;
        a dielectric layer formed on the first surface;
        a color filter layer formed on the dielectric layer;
        a second dielectric layer formed on the color filter layer; and
        a metal containing layer formed on the second dielectric layer;
    a microarray formation layer formed over the metal containing layer, the microarray formation layer having one or more wells formed therein, each of the one or more wells having a bottom surface in contact with the metal containing layer;
    a porous silicon-containing layer formed on the bottom surface of the one or more wells, the porous silicon-containing layer having an exposed surface; and
    a biofunctionalizing material formed on the porous surface.

11. The biomedical device of claim 10, wherein the biofunctionalizing material is a hydrogel.

12. The biomedical device of claim 10, wherein the porous silicon-containing layer is doped with boron, nitrogen, carbon, helium or combinations thereof.

13. A biomedical device, comprising:
    a metal containing layer formed over a support substrate, wherein the metal containing layer comprises tantalum oxide layer, a tungsten oxide layer, or a hafnium oxide layer;
    a microarray formation layer formed over the metal containing layer, the microarray formation layer having one or more wells formed through the microarray formation layer to expose a portion of the metal containing layer;
    a porous silicon-containing layer formed on the exposed portion of the metal containing layer in the one or more wells;
    a biofunctionalizing material formed over the porous silicon-containing layer; and
    a biological probe positioned over the biofunctionalizing material and in connection with the porous silicon-containing layer.

14. The biomedical device of claim 13, wherein the porous silicon-containing material comprises silicon and oxygen.

15. The biomedical device of claim 14, wherein the porous silicon-containing layer is doped with boron, nitrogen, carbon, helium or combinations thereof.

16. The biomedical device of claim 13, wherein the biofunctionalizing material is a hydrogel.

17. The biomedical device of claim 13, wherein the biological probe is a polynucleotide.

18. A biomedical device, comprising:
    a metal containing layer formed over a support substrate, wherein the metal containing layer comprises tantalum oxide layer, a tungsten oxide layer, or a hafnium oxide layer;
    a microarray formation layer formed over the metal containing layer, wherein the microarray formation layer is a silicon nitride layer, and the microarray formation layer has one or more wells formed through the microarray formation layer to expose a portion of the metal containing layer;
    a porous silicon-containing layer formed on the exposed portion of the metal containing layer in the one or more wells;
    a biofunctionalizing material formed over the porous silicon-containing layer; and
    a biological probe positioned over the biofunctionalizing material and in connection with the porous silicon-containing layer.

* * * * *

UNITED STATES PATENT AND TRADEMARK OFFICE
CERTIFICATE OF CORRECTION

PATENT NO. : 10,167,574 B2
APPLICATION NO. : 14/577971
DATED : January 1, 2019
INVENTOR(S) : Sangmin Jeong et al.

It is certified that error appears in the above-identified patent and that said Letters Patent is hereby corrected as shown below:

In the Specification

In Column 7, Line 9, delete "2,4,6-trisilaoxane" and insert -- 2,4,6-trisiloxane --, therefor.

In Column 7, Line 51, delete "2,4,6-trisilaoxane" and insert -- 2,4,6-trisiloxane --, therefor.

In Column 9, Line 3, delete "dioxan," and insert -- dioxin, --, therefor.

In Column 9, Line 39, delete "2,4,6-trisilaoxane" and insert -- 2,4,6-trisiloxane --, therefor.

In Column 9, Line 58, delete "2,4,6-trisilaoxane" and insert -- 2,4,6-trisiloxane --, therefor.

In Column 9, Lines 64-65, delete "2,4,6-trisilaoxane" and insert -- 2,4,6-trisiloxane --, therefor.

In Column 10, Line 21, delete "to to" and insert -- to --, therefor.

In Column 11, Line 39, delete "FIG." and insert -- FIGS. --, therefor.

In Column 11, Line 44, delete "FIG." and insert -- FIGS. --, therefor.

In Column 12, Line 10, delete "FIG." and insert -- FIGS. --, therefor.

Signed and Sealed this
Seventh Day of May, 2019

Andrei Iancu
*Director of the United States Patent and Trademark Office*